United States Patent [19] [11] 3,948,414
Hagerty [45] Apr. 6, 1976

[54] MASTER CYLINDER DIAPHRAGM
[75] Inventor: Sydney E. Hagerty, St. Joseph, Mich.
[73] Assignee: The Bendix Corporation, South Bend, Ind.
[22] Filed: Dec. 13, 1974
[21] Appl. No.: 532,343

[52] U.S. Cl. ............. 220/203; 137/525; 137/525.1; 220/367; 340/244 E
[51] Int. Cl.² ........................................ B65D 51/16
[58] Field of Search............ 137/525, 525.1, 516.15; 220/203, 367, 368; 60/562; 340/244 E; 73/308

[56] References Cited
UNITED STATES PATENTS

| | | | |
|---|---|---|---|
| 2,685,297 | 8/1954 | Clearman | 137/525 |
| 3,363,644 | 1/1968 | Malec | 137/525 |
| 3,369,666 | 2/1968 | Hultgren | 137/525.1 |
| 3,423,939 | 1/1969 | Lewis et al | 137/525 |
| 3,448,579 | 6/1969 | Reznicek | 60/562 |
| 3,463,346 | 8/1969 | Mitchell | 220/203 |
| 3,504,822 | 4/1970 | Haloski | 137/525 |
| 3,522,706 | 8/1970 | Bueler | 60/562 |
| 3,547,355 | 12/1970 | Salazar | 137/525 |
| 3,731,487 | 5/1973 | Beyer et al | 60/562 |

Primary Examiner—William Price
Assistant Examiner—Allan N. Shoap
Attorney, Agent, or Firm—Leo H. McCormick, Jr.; William N. Antonis

[57] ABSTRACT

A cover apparatus for a master cylinder reservoir which has a diaphragm with an expandable surface. A check valve is located in an opening in the expandable surface to limit the pressure differential created thereacross by air at atmospheric pressure on one side thereof and vacuum in the reservoir on the other side thereof upon a depletion of fluid from the reservoir. With a change in the pressure differential, the expandable surface will be prevented from moving into the fluid and influencing the output from a fluid level indicator located therein.

6 Claims, 4 Drawing Figures

MASTER CYLINDER DIAPHRAGM

BACKGROUND OF THE INVENTION

U.S. Pat. No. 3,196,617 discloses a way whereby air-borne contamination can be prevented from being communicated to a reservoir of a master cylinder. In this apparatus, a diaphragm which seals the reservoir from tha atmosphere will follow the brake fluid level as changes occur therein. Under some conditions, a pressure differential will occur across the diaphragm which will move the diaphragm into the brake fluid. When the diaphragm is moved in the brake fluid, a portion of this fluid will be displaced upward along the diaphragm and the walls of the reservoir creating a false fluid level indication of the quantity of brake fluid within the reservoir.

SUMMARY OF THE INVENTION

I have devised a cover means for a master cylinder which will limit the creation of a pressure differential across a diaphragm means to prevent the establishment of a false fluid level indication caused by displacement of fluid by the diaphragm means. The diaphragm means has an expandable section which has an opening therein into which a check valve means is secured. When a pressure differential sufficient to move the diaphragm into the fluid is developed between the reservoir and the atmosphere, the check valve means will open and attenuate the pressure differential sufficiently to prevent the development of a false fluid level signal for operating a fluid level indicator in the reservoir.

It is therefore the object of this invention to provide a master cylinder with a diaphragm means having a check valve means to limit the development of a pressure differential which could move the diaphragm means sufficiently to interfere with the output from a fluid level indicator.

It is another object of this invention to provide a master cylinder with a diaphragm means through which air from the atmosphere is communicated to the reservoir to prevent the diaphragm from being moved within the fluid retained in a reservoir.

It is a still further object of this invention to provide a diaphragm with a pressure relief means to limit the movement of the diaphragm as it follows the level of the fluid therein to assure that an accurate indication of the quantity of fluid within the reservoir is recorded by an indicator.

These and other objects of this invention will become apparent from reading this specification and viewing the drawings.

DETAILED DESCRIPTION OF THE PREFERRED EMBODIMENT

Figure 1:
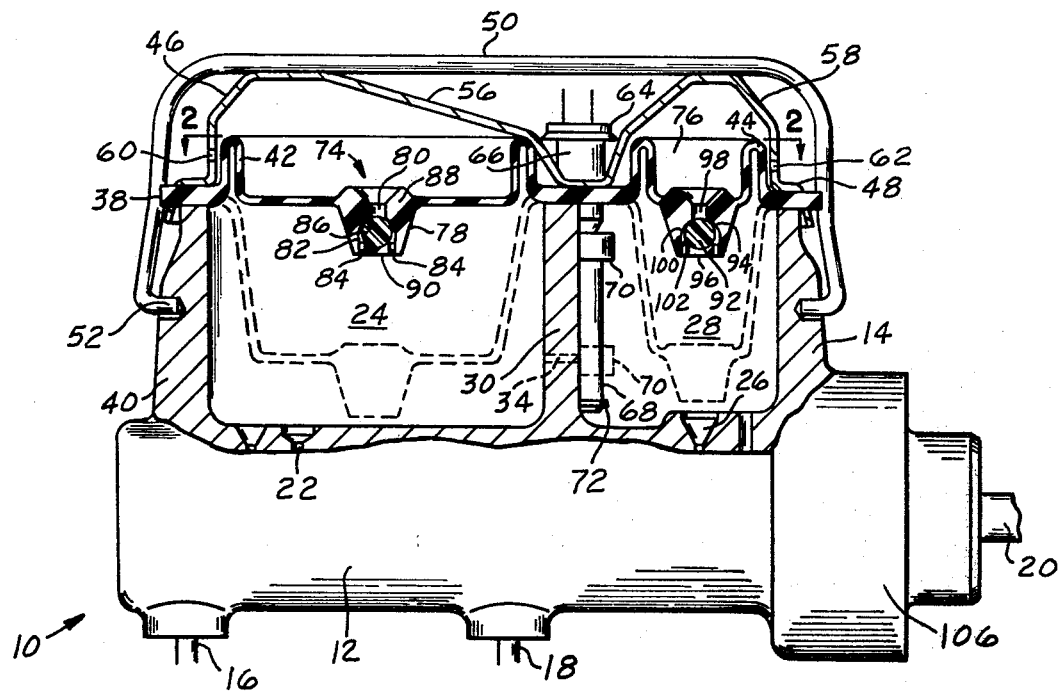
FIG. 1 is a sectional view of a master cylinder reservoir and cover means having a diaphragm means through which air is communicated through a check valve means controlled by a pressure differential.
Figure 2:
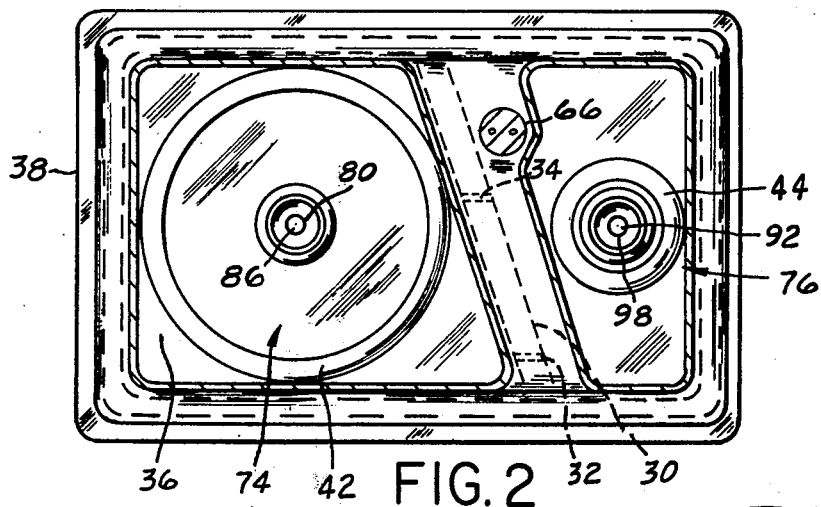
FIG. 2 is a view taken along line 2—2 of FIG. 1.

The master cylinder 10 shown in FIG. 1 has a cylindrical power producing means 12 to which a reservoir means 14 is attached. The power producing means 12 retains a first piston (not shown) and a second piston (not shown) for developing a first fluid pressure, which is communicated to the front brakes of a vehicle through outlet port 16, and a second fluid pressure, which is communicated to the rear brakes of a vehicle through port 18, in response to an input force supplied through push rod 20 by an operator.

The first piston is connected through compensation port 22 to a first section 24 and the second piston is connected through compensation port 26 to a second section 28 of the reservoir means 14. A wall 30 which separates the first section 24 from the second section 28 permits restricted communication through passages 32 and 34.

A diaphragm 36 has a flat section with a peripheral surface 38 which overlies the outside wall 40 of the reservoir means 14 and a first expandable surface 42 and a second expandable surface 44 located over the first section 24 and the second section 28, respectively.

A cap means 46 has a flange 48 which engages the periphery 38 of the diaphragm 36, a first projection 56 into which the first expandable surface 42 of the diaphragm means 36 is nestled, and a second projection 58 into which the second expandable surface 44 is nestled.

A bail wire 50 has a first end 52 and a second end 54 attached to the housing 40 to resiliently bias the peripheral edge 38 against the housing 40 and seal the first chamber 24 and the second chamber 28 from the atmosphere upon engagement with the first projection 56 and the second projection 58. The cap means 46 has breather ports 60 and 62 for connecting the first projection 56 and the second projection 58 with the atmosphere.

A fluid level indicator 64 has a grommet 66, which passes through the cap means 46, and a cylindrical shaft 68 which extends into the second section 28 of the reservoir means 14. A float 70 which follows the level of the fluid in the reservoir is retained on the shaft 68 by a snap ring 72.

A first check valve means 74 is located in the center of the first expandable surface 42 and a second check valve means 76 is located in the center of the second expandable surface 44. The first check valve means 74 has an annular surface or shoulder 78 which projects from the expandable surface 42 toward the first section 24 of the reservoir 14. An axial passageway 80 extends into a control chamber 82. A series of smaller passageways or holes 84 connect the control chamber 82 with the reservoir 74. A spherical ball 86 having a diameter which is larger than the distance between seat 88 and resilient surface 90 is located in the control chamber 82. The resilient surface 90 urges the ball 86 against seat 88 to seal the control chamber 82 from the atmosphere. Similarly, ball 92 in the second check valve means 76 is held against seat 94 by the resiliency of surface 96 to prevent air from the atmosphere from being communicated through passageway 98 to the control chamber 100 and out the plurality of passageways or holes 102 to the reservoir.

MODE OF OPERATION OF THE PREFERRED EMBODIMENT

Upon desiring to stop a vehicle, the operator will cause an input force to be applied to push rod 20 which will move the power pistons in the cylindrical bore 12 of the master cylinder 10. Initial movement of the power pistons will close the compensation ports 22 and 26 to allow fluid pressure to build up in the cylindrical bore 12 and be transmitted through output ports 16 and 18 to operate the front and rear braking systems of the vehicle. Upon termination of the input force on the push rod 20, return springs (not shown) in the cylindrical bore will move the power pistons to a rest position against a stop in the rear 106 of the cylindrical housing. If any fluid is lost from the braking system, a vacuum will draw fluid from the reservoir means 14 to maintain the quantity of operational fluid in the bore 12 within a predetermined level. At the same time, float 70 will correspondingly move on shaft 68 to provide the operator with an indication of a change in the fluid reservoir 14. As fluid is drawn out of the reservoir means 14, a vacuum will be created in this sealed chamber causing the first expandable section 42 and the second expandable section 44 to move toward the first section 24 and the second section 28 respectively. When the pressure differential reaches a predetermined level sufficient to displace the expandable sections 42 and 44 into the fluid, the balls 86 and 92 will move in opposition to the resilient surfaces 90 and 102, respectively, and allow air to flow through either passageway 80 or 98 to attenuate this pressure differential and prevent float 70 from being influenced by an erroneous fluid level. The fluid level in both the first section 24 and the second section 28 will be maintained at the same level since restrictive passages 32 and 34 will allow free communication therebetween. However, if the fluid level in either the first section 24 or the second section 28 falls below the restrictive passages 32 and 34, the float 70 will activate the fluid level indicator 64 causing a continual signal to forewarn the operator of an unsafe operating condition in the braking system. The restrictive ports 32 and 34 are so located from the compensating ports 22 and 26 to assure that both the front brakes and the rear brakes wll not fail from the loss of fluid through a single failure.

Figure 3:
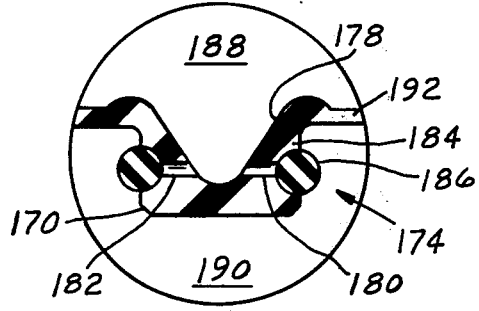
FIG. 3 is another embodiment of a check valve for use with the diaphragm means in FIG. 1.

The check valve means 174 shown in FIG. 3 has a conical chamber 178 with a first radial passageway 180 and a second radial passageway 182 terminating in an annular groove 184 on the projection 170. A flexible ring 186 located in the annular groove 184 will interrupt any communication between the atmosphere present on the top side 188 of the expandable section 192 of the diaphragm and the reservoir side 190. When a pressure differential sufficient to move the expandable section 192 occurs, ring 186 will be moved away from passages 180 and 182 to allow air to enter and attenuate this pressure differential.

Figure 4:
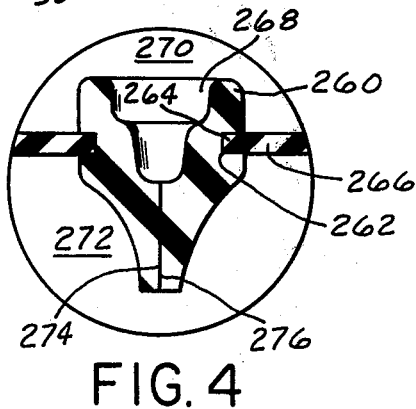
FIG. 4 is another embodiment of a check valve for use with the diaphragm means in FIG. 1.

In the check valve embodiment shown in FIG. 4, an annular body 260 has a groove 262 which is snapped into an opening 264 in the expandable portion 266 of a diaphragm. The annular body has a channel 268 which extends from the top side 270 of the diaphragm to the bottom side. The channel has a first flat surface 274 and a second flat surface held together by the resiliency of the annular body to seal the reservoir side 272 from the atmospheric side 270. When a pressure differential sufficient to move the expandable portion in the fluid into the reservoir occurs, the first flat surface 274 will separate from the second flat surface and air will flow through the channel into the reservoir to attenuate this pressure differential.

Thus, I have devised a diaphragm means whereby the fluid in the reservoir is protected from being contaminated by foreign particles in the air which could be detrimental to the braking system and yet the operation of a fluid level indicator is not presented with a false fluid level signal which indicates a greater quantity of fluid present in the reservoir than is actually present.

I claim:

1. A cover means for use in a master cylinder for separating a reservoir in a housing from the atmosphere to prevent contaminants contained in the atmosphere from being communicated to the fluid in the reservoir and for allowing the level of the fluid in the reservoir to be monitored without interference, said cover means comprising:

diaphragm means having a peripheral surface which engages said housing for sealing the reservoir from the atmosphere and an expandable surface which moves with the surface of the fluid in the reservoir, said diaphragm means having an opening therethrough, said expandable surface having an annular projecting shoulder extending therefrom with a passageway therethrough for communicating air from the atmosphere into the reservoir;

cap means overlying said diaphragm means having a breather port therein for allowing air from the atmosphere to freely be communicated to said passageway;

fastener means attached to said housing for applying a biasing force to said cap means to establish a seal between said peripheral surface of the diaphragm means and the housing;

indicator means extending through said opening of the diaphragm means having a float means to engage said fluid in said reservoir; and check valve means connected to said passageway in the diaphragm means and responsive to a pressure differential created across said diaphragm means between the atmosphere and the reservoir for allowing air from the atmosphere to enter said reservoir through said passageway to prevent said expandable surface from engaging and displacing the fluid in the reservoir thereby avoiding the development of an erroneous fluid level signal as measured by said float means on the indicator means.

2. The cover means, as recited in claim 1, wherein said passageway in said annular projecting shoulder includes:

a control chamber having a series of outlet ports connected to said reservoir.

3. The cover means, as recited in claim 2, wherein said outlet ports are connected to an annular groove around the periphery of the annular projecting shoulder.

4. The cover means, as recited in claim 3, wherein said check valve means includes:

ring means located in said annular groove to prevent communication through said outlet passages until said pressure differential moves the ring out of said groove to allow air to pass into the reservoir.

5. The cover means, as recited in claim 2, wherein said check valve means includes:

a spherical member located in said control chamber and biased toward said passageway to prevent communication of air therethrough to the control chamber, said pressure differential acting on and moving said spherical member away from said passageway to allow said air to flow into the reservoir and reduce the intensity of the pressure differential.

6. The cover means, as recited in claim 1, wherein said check valve means includes:
an annular body connected to said shoulder in said expandable surface having an axial opening which extends into a channel formed by a connecting means joining a first flat surface with a second flat surface and the annular body, said channel terminating at a point where the first flat surface, said connecting means holding the first flat surface against the second flat surface to resiliently seal the channel from the atmosphere, said pressure differential overcoming the resilient seal to allow air to enter the reservoir and prevent the expandable surface from entering the fluid.

* * * * *